United States Patent
Chen et al.

(10) Patent No.: US 11,945,753 B2
(45) Date of Patent: Apr. 2, 2024

(54) LOW LOSS POWER FERRITES AND METHOD OF MANUFACTURE

(71) Applicant: Rogers Corporation, Chandler, AZ (US)

(72) Inventors: Yajie Chen, Brighton, MA (US); Yiying Yao, Woburn, MA (US)

(73) Assignee: ROGERS CORPORATION, Chandler, AZ (US)

( * ) Notice: Subject to any disclaimer, the term of this patent is extended or adjusted under 35 U.S.C. 154(b) by 528 days.

(21) Appl. No.: 17/288,363

(22) PCT Filed: Oct. 16, 2019

(86) PCT No.: PCT/US2019/056462
§ 371 (c)(1),
(2) Date: Apr. 23, 2021

(87) PCT Pub. No.: WO2020/092004
PCT Pub. Date: May 7, 2020

(65) Prior Publication Data
US 2021/0380486 A1 Dec. 9, 2021

Related U.S. Application Data

(60) Provisional application No. 62/754,938, filed on Nov. 2, 2018.

(51) Int. Cl.
| | |
|---|---|
| C04B 35/26 | (2006.01) |
| C04B 35/626 | (2006.01) |
| C04B 35/634 | (2006.01) |
| C04B 35/64 | (2006.01) |
| H01F 10/22 | (2006.01) |

(52) U.S. Cl.
CPC ...... *C04B 35/2658* (2013.01); *C04B 35/2675* (2013.01); *C04B 35/62695* (2013.01); *C04B 35/63416* (2013.01); *C04B 35/6342* (2013.01); *C04B 35/64* (2013.01); *H01F 10/22* (2013.01); *C04B 2235/3262* (2013.01); *C04B 2235/3274* (2013.01); *C04B 2235/3284* (2013.01); *C04B 2235/5436* (2013.01); *C04B 2235/5445* (2013.01); *C04B 2235/604* (2013.01); *C04B 2235/6584* (2013.01); *C04B 2235/80* (2013.01)

(58) Field of Classification Search
CPC . H01F 10/22; C04B 35/2658; C04B 35/2675; C04B 35/62695; C04B 35/63415; C04B 35/6342; C04B 35/64; C04B 2235/5436; C04B 2235/5445; C04B 2235/604; C04B 2235/6584; C04B 2235/80
See application file for complete search history.

(56) References Cited

U.S. PATENT DOCUMENTS

| | | |
|---|---|---|
| 2004/0053075 A1 | 3/2004 | Oda et al. |
| 2011/0177696 A1 | 7/2011 | Yano et al. |
| 2019/0139687 A1 | 5/2019 | Chen et al. |

FOREIGN PATENT DOCUMENTS

| | | |
|---|---|---|
| CN | 103833343 A | 6/2014 |
| CN | 105481359 A | 4/2016 |
| CN | 106747397 A | 5/2017 |
| JP | H04193797 A | 7/1992 |
| JP | H05335132 A | 12/1993 |
| JP | 2001151564 A | 6/2001 |
| WO | 2004042752 A1 | 5/2004 |
| WO | 2012154741 A | 11/2012 |

OTHER PUBLICATIONS

Angadi, V. J. et al., "Effect of SM3+-Gd3+ on structural, electrical and magnetic properties of Mn—Zn ferrites synthesized via combustion route," Journal of Alloys and Compounds, vol. 656, 2016; pp. 5-12.

Islam, A. et al., "Study of the structural, magnetic and electrical properties of Gd-substituted Mn—Zn mixed ferrites", Journal of Alloys and Compounds, vol. 559, 2013; pp. 174-180.

Thakur, P. et al., "Superparamagnetic La doped Mn—Zn nano ferrites: dependence on dopant content and crystallite size," Materials Search Express, vol. 3, 2016; 15 pages.

Torkian et al., "Strctural and Megnetic Consequences of Mn0.6Zn0.4Fe2-xGdxO4 Ferrite," J. Supercond. Nov. Magn., published online Feb. 15, 2016; 9 pages.

Andalib, P. et al., "Concurrent Core Loss Suppression and High Permeability by Introduction of Highly Insulating Intergranular Magnetic Inclusions to MnZn Ferrite", IEEE Magnetics Letters, vol. 9, pp. 1-5, 2018, Art No. 5100705, doi: 10.1109/LMAG.2017.2771391.

(Continued)

*Primary Examiner* — C Melissa Koslow
(74) *Attorney, Agent, or Firm* — CANTOR COLBURN LLP

(57) ABSTRACT

A multiphase ferrite composition includes a primary phase consisting of a MnZn ferrite matrix; and 0.01 to 10 weight percent microscaled inclusion particles comprising an orthoferrite RFeO3 wherein R is a rare earth ion, yttrium iron garnet (YIG), or a combination thereof, wherein the microscaled inclusion particles have an average particle size (D50) of 0.1 micron to 5 microns, and wherein the D50 of the microscaled inclusion particles is smaller than the average particle size (D50) of the MnZn ferrite particles; and optionally 0.01 to 5 weight percent additive; wherein weight percent is based on the total weight of the multiphase ferrite composition. A method of manufacturing the multiphase ferrite composition is also disclosed.

22 Claims, No Drawings

(56) References Cited

OTHER PUBLICATIONS

International Search Report for International application No. PCT/US2019/056462; International filing date: Oct. 16, 2019; dated Feb. 20, 2020; 5 pages.
Shokrollahi, H. et al., Influence of additives on the magnetic properties, microstructure and densification of Mn—Zn soft Ferrites, Materials Science and Engineering B 141 (2007); pp. 91-107.
Shokrollahi, H., Magnetic properties and densification of Manganese-Zinc Soft Ferrites (Mn1-xZnxFe2O4) doped with low melting point oxides, Journal of Magnetism and Magnetic Materials 320 (2008); pp. 463-474.
Written Opinion of the International Searching Authority for International application No. PCT/US2019/056462; International filing date: Oct. 16, 2019; dated Feb. 20, 2020; 10 pages.
Xing, Q et al., "Doping Effect of Y3+ ions on the microstructural and electromagnetic Properties of Mn—Zn Ferrites", Physica B 407 (2012); pp. 388-392.

LOW LOSS POWER FERRITES AND METHOD OF MANUFACTURE

CROSS REFERENCE TO RELATED APPLICATIONS

This Application is a National Stage application of PCT/US2019/056462, filed Oct. 16, 2019, which claims priority to U.S. Provisional Application No. 62/754,938, filed Nov. 2, 2018, each of which is incorporated by reference in its entirety herein.

BACKGROUND

The present disclosure relates generally to methods of making low loss composites for power applications, the low loss composites made by the methods, and articles comprising the low loss composites.

Low-loss and small-sized ferrite components for power applications have been desired for decades. With the current rapid development of power electronics, particularly the application of wide-bandgap devices, low-loss ferrite materials for high frequency applications are urgently required.

There have been numerous attempts to reduce power loss density of power ferrite materials. Most of these attempts involve increasing electrical resistivity by adding nonmagnetic (e.g., paramagnetic, diamagnetic, or antiferromagnetic) insulating material into the ferrite matrix. However, the drawback of use of a nonmagnetic material is a significant reduction in the material's permeability and saturation magnetic flux density.

There is a need in the art for ferrite materials that have a low loss, high permeability, and high saturation at high operating frequency (50 kHz to 10 MHz) for power applications, and for cost-effective and flexible methods of making such ferrite material.

SUMMARY

Disclosed herein is a method for manufacturing a multiphase ferrite composition, comprising combining MnZn ferrite particles, 0.01 to 10 weight percent microscaled inclusion particles comprising an orthoferrite $RFeO_3$ wherein R is a rare earth ion, preferably R is Y, Ho, Er, Gd, or Lu; yttrium iron garnet (YIG); or a combination thereof, and optionally 0.01 to 5 weight percent additive to form a ferrite mixture, wherein weight percent is based on the total weight of the ferrite mixture, wherein the microscaled inclusion particles have an average particle size (D50) of 0.1 micron to 5 microns, preferably 0.15 to 2 microns, or 1 to 5 microns, and wherein the D50 of the microscaled inclusion particles is smaller than the average particle size (D50) of the MnZn ferrite particles; granulating a slurry comprising the ferrite mixture and a binder solution to obtain granules of 50 to 750 microns, preferably 100 to 500 microns; compressing the granules to form a green body; and sintering the green body in 0.01 to 20% oxygen to form a multiphase ferrite compositionC.

Also disclosed is a multiphase ferrite composition comprising: a primary phase consisting of a MnZn ferrite matrix; and 0.01 to 10 weight percent microscaled inclusion particles comprising an orthoferrite $RFeO_3$ wherein R is a rare earth ion, preferably R is Y, Ho, Er, Gd, or Lu; yttrium iron garnet (YIG); or a combination thereof, wherein the microscaled inclusion particles have an average particle size (D50) of 0.1 micron to 5 microns, preferably 0.15 to 2 microns or 1 to 5 microns, and wherein the D50 of the microscaled inclusion particles is smaller than the average particle size (D50) of the MnZn ferrite particles; and optionally 0.01 to 5 weight percent additive; wherein weight percent is based on the total weight of the multiphase ferrite composition.

The above described and other features are exemplified by the following detailed description.

DETAILED DESCRIPTION

The inventors have developed multiphase ferrite compositions comprising microscaled inclusions of ferrimagnetic or weak-ferromagnetic dielectrics introduced into a MnZn ferrite matrix and methods of manufacturing the multiphase ferrite compositions. The multiphase ferrite compositions have increased resistivity while retaining high permeability and saturation magnetization. The inclusions reduce the power loss density while retaining, or even increasing, permeability of the multiphase ferrite composition. The multiphase ferrite compositions are particularly suitable for use in power applications at high operating frequency, e.g. 50 kilohertz (KHz) to 10 megahertz (MHz).

As stated above, the multiphase ferrite composition includes a primary phase consisting of a MnZn ferrite matrix into which microscaled inclusion particles of a dielectric material that is ferrimagnetic or weakly ferromagnetic at room temperature have been introduced. The microscaled inclusion particles can be located at the grain boundaries of the MnZn ferrite or within the grains. Optionally, the multiphase ferrite composition further comprises an additive composition. The multiphase ferrite composition exhibits ultra-low power loss while retaining high permeability and high magnetic flux density at an operating frequency of 50 kHz to 10 MHz. For example, the multiphase ferrite composition can have a power loss (Pv) of 50 to 150 $mW/cm^3$ at 200 kHz, 100 mT; a permeability of 1000 to 3500; and/or a magnetic flux density of at least 450-500 mT.

The MnZn ferrite matrix is a MnZn ferrite of formula $Mn_{1-x}Zn_xFe_{2+y}O_4$, wherein x=0.1 to 0.9, and y=0 to 0.4, optionally including a dopant. The MnZn ferrite dopant can be Co, Ni, Ti, Zr, Sn, Si, V, Ta, Nb, Ca, or a combination thereof. The MnZn ferrite is selected with care to provide the matrix with the desired characteristics, such as permeability, at the operating frequency of the intended use.

The optionally doped MnZn ferrite can be obtained commercially in powder or granular form. Alternatively, the optionally doped MnZn ferrite can be synthesized by any suitable method.

An exemplary method for synthesizing the MnZn ferrite comprises mixing suitable amounts of MnO, ZnO, $Fe_2O_3$, and optionally a dopant source; calcining the mixture of oxides; and reducing the calcined product to a desired particle size. The dopant source can be CoO, NiO, CaO, $SiO_2$, $TiO_2$, $ZrO_2$, $SnO_2$, $V_2O_5$, $Nb_2O_5$, $Ta_2O_5$, or a combination thereof. A suitable amount of the dopant source is an amount to provide the desired degree of doping in the MnZn ferrite, for example a level of doping of 0.005 to 15 weight percent, 0.005 to 8 weight percent, 0.005 to 5 weight percent, 0.01 to 5 weight percent, 0.05 to 5 weight percent, or 0.1 to 5 weight percent, where weight percent is based on the total weight of all source compounds. Calcination of the mixture of oxides can be performed in air or other suitable atmosphere. The temperature can be 600° C. to 1500° C., preferably 800° C. to 1300° C. Calcination of the mixture of oxides is performed for a period of time suitable to produce the optionally doped MnZn ferrite from the mixture, for example for a period of 1 to 12 hours, or 2 to 10 hours.

Reducing the particle size of the calcined product can be performed by any suitable method. For example the calcined product can be crushed and/or subjected to grinding, and optionally sieved. For fabricating the multiphase ferrite composition, the final average particle size of the optionally doped MnZn ferrite should be larger than the average particle size of the microscaled inclusion particles, and for example, can be 0.5 micron to 10 microns, or 0.5 micron to 2 microns, or 1 micron to 5 microns, or 5 microns to 10 microns.

Herein, "particle size" means a volume distribution particle size. The term "average particle size" or "D50" refers to the volume distribution particle size value at which 50% of the particles have a volume distribution particle size less than the value. Particle size can be determined by sedigraph methods, laser diffraction, or equivalent methods. In certain embodiments, particle size is determined by laser diffraction, for example with a Horiba LA-960 laser particle size analyzer.

The microscaled inclusion particles are selected with care to provide the multiphase ferrite composition with the desired characteristics, such as permeability at the operating frequency of the intended use of the multiphase ferrite composition. The microscaled inclusion particles can be an orthoferrite $RFeO_3$, where R is a rare earth ion; $Y_3Fe_5O_{12}$ (yttrium iron garnet, "YIG"); or a combination thereof. Preferably, R in the orthoferrite is Y, Ho, Er, Gd, or Lu, more preferably R is Y, Ho, or Er.

A characteristic feature of rare-earth orthoferrites is the presence of two magnetic subsystems, $R^{3+}$ and $Fe^{3+}$. Without being bound by theory, it is believed that the competition of Fe—Fe, R—Fe, and R—R interactions leads to several interesting phenomena in these materials. The corresponding spin arrangement is a canted antiferromagnetic structure with a small total ferromagnetic moment directed along the c(c//z) crystal axis, and an antiferromagnetic vector directed along the a(a//x) crystal axis. The rare-earth ions remain paramagnetic but develop a magnetic moment in the molecular field of the iron ions subsystem.

Yttrium iron garnet is a ferrite material with magnetic and magnetoelectric properties that suit various applications in optical devices and microwave communication components, particularly high frequency applications. The cubic crystal structure of YIG includes three sub-lattices: the dodecahedra (c) site, the octahedral (a) site, and the tetrahedral (d) site occupied by the three yttrium ions, two iron ions, and three iron ions, respectively. Without being bound by theory, it is believed that the magnetic behavior of the YIG structure arises from the super-exchange interaction between the iron ions in the a- and d-sites, which have antiparallel alignment, which produces a magnetic moment due to the surplus iron ion in the d-site.

The microscaled inclusion particles can further comprise a dopant. Examples of the dopant in a doped $RFeO_3$ include Zr, Ti, and a combination thereof. Examples of the dopant in a doped YIG include Ce, Ca, V, Mn, Gd, Al, In, and a combination thereof. The microscaled inclusion particles can be present in the multiphase ferrite composition in an amount of 0.005 to 15 weight percent, or 0.01 to 10 weight percent, or 0.01 to 5 weight percent, based on the total weight of the multiphase ferrite composition. Herein, "microscaled" means that the particle has a volume-based average particle size (D50) of at least 0.1 micron, or at least 0.15 micron, or at least 0.25, or at least 0.5 micron but no more than 10 microns, or no more than 5 microns, or no more than 2 microns. The microscaled inclusion particles should have a D50 smaller than the D50 of the MnZn ferrite particles.

The microscaled inclusion particles can be obtained commercially in powder or granular form. Alternatively, the microscaled inclusion particles can be synthesized by any suitable method.

An exemplary method for synthesizing optionally doped microscaled inclusion particles comprises mixing suitable amounts of a source compound for the rare earth ion, such as a rare earth oxide, and $Fe_2O_3$, and optionally a dopant source; calcining the mixture of oxides; and reducing the calcined product to a desired particle size. Examples of the dopant source include $TiO_2$, $ZrO_2$, $SnO_2$, $Gd_2O_3$, $In_2O_3$, $Al_2O_3$, and a combination thereof. A suitable amount of the dopant source is an amount to provide the desired degree of doping in the orthoferrite or YIG, for example a level of doping of 0.005 to 8 weight percent, 0.005 to 5 weight percent, 0.01 to 5 weight percent, 0.05 to 5 weight percent, or 0.1 to 5 weight percent, where weight percent is based on the total weight of all source compounds. Calcination of the mixture of oxides can be performed in air or other suitable atmosphere, such as 20 to 100% oxygen. The temperature can be 600° C. to 2000° C., 700° C. to 1700° C., or 800° C. to 1500° C. Calcination of the mixture of oxides is performed for a period of time suitable to produce the optionally doped inclusion particles from the mixture, for example for a period of 1 to 12 hours, or 2 to 10 hours, or 3 to 8 hours. Reducing the particle size of the calcined product can be performed by any suitable method. For example the calcined product can be crushed and/or subjected to grinding. Reducing the particle size of the calcined product can be performed in an attritor, a rolling mill, a cross-beat mill, or the like. For fabricating the multiphase ferrite composition, the final average particle size of the optionally doped microscaled inclusion particles can be 0.1 micron to 10 microns, or 0.1 micron to 5 microns, or 0.15 micron to 2 microns, or 1 micron to 5 microns, with the proviso that the average particle size of the optionally doped microscaled inclusion particles is smaller than the average particle size of the MnZn ferrite particles, For example, to synthesize a doped orthoferrite $YFeO_3$, stoichiometric amounts of $Y_2O_3$ and $Fe_2O_3$, and a dopant source, such as $TiO_2$ and/or $ZrO_2$, can be mixed. The mixture of oxides are then calcined at a temperature of 1000 to 1200° C. The particle size of the calcined product is reduced to a desired particle size.

For example, to synthesize a doped YIG, stoichiometric amounts of $Y_2O_3$ and $Fe_2O_3$, and a dopant source, such as $Ce_2O_3$, CaO, $V_2O_5$, MnO, $Gd_2O_3$, $In_2O_3$, and/or $Al_2O_3$, can be mixed. The mixture of oxides can be calcined; and then the particle size of the calcined product can be reduced to a desired particle size at a temperature of 1200 to 1500° C.

The additive optionally present in the multiphase ferrite can be CaO, $SiO_2$, $TiO_2$, $ZrO_2$, $SnO_2$, $V_2O_5$, $Nb_2O_5$, $Ta_2O_5$, CoO, $Bi_2O_3$, $MoO_3$, or a combination thereof. The additive can be present in the multiphase ferrite at 0.01 to 5 weight percent, based on the total weight of the multiphase ferrite composition. The additive is selected with care to provide the multiphase ferrite composition with the desired characteristics, such as microstructure or improved power loss characteristics at the operating frequency of the intended use of the multiphase ferrite composition.

A method for manufacturing the multiphase ferrite composition comprises combining MnZn ferrite particles, microscaled inclusion particles having an average particle size (D50) smaller than the D50 of the MnZn ferrite particles, and optionally an additive to form a ferrite mixture; granulating a slurry comprising the ferrite mixture and a binder solution to obtain granules of 50 to 750 microns, preferably 100 to 500 microns; compressing the granules to form a green body; and sintering the green body. Sintering can be performed, for example, at a temperature of 1000 to 1500° C. in 0.01 to 20% oxygen to form a multiphase ferrite composition, preferably the temperature is 1100 to 1350° C. In some embodiments the inclusion particles, and optionally an additive, are mixed with the MnZn ferrite particles prior to grinding the mixture to obtain MnZn ferrite particles of the selected particle size.

The binder solution can be added to the ferrite mixture in an amount of 3 to 20 weight percent, or 5 to 15 weight percent to form a slurry, where weight percent is based on the total weight of the slurry. The binder solution can be an aqueous solution of 4 to 6 weight percent polyvinyl alcohol or poly vinyl butyral, or the like.

Granulating the slurry can be performed using any suitable method, for example by using a thermal spray dryer system, for achieving granules of a suitable size. In certain embodiments, granules have a size of 50 to 750 micrometers, or 100 to 500 micrometers.

Compression of the granules to form a green body is performed at 0.3 to 4 Tonne/cm$^2$, preferably 0.5 to 3 Tonne/cm$^2$.

The green body can be molded into many different geometries. In some embodiments, the green body is shaped into a core component. Examples of core components include a toroid, a plate, a disk, an E-core, and an EI-core.

Sintering the green body can be performed in air or a nitrogen atmosphere comprising 0.01 to 20% oxygen. The sintering temperature can be 1000 to 1500° C., preferably the temperature is 1100 to 1350° C. The dwelling time can be 1 to 12 hours, or 2 to 10 hours, or 3 to 8 hours. Cooling the sintered product to room temperature (25° C.) can be performed in a controlled atmosphere. For example, during cooling, the oxygen partial pressure can be controlled to be within a range of 0.005 to 8%, or 0.01 to 5%. Low oxygen partial pressure in the desired atmosphere condition during heating and cooling phases can be controlled by the flow rate of nitrogen gas in the atmosphere, for example a flow rate of 0.5 to 5 liters/min nitrogen gas, or 1 to 3 liters/min nitrogen gas. Suitable heating and cooling rates can be selected to obtain a product with the desired characteristics.

The sintered body can be further machined as needed to meet various application requirements.

An article can comprise the multiphase ferrite composition. Examples of the article include a transformer; an electronic device; an inductor; a power electronic device; a power converter; an inductor device; an antenna; a transmit and receive module (TRM); an Electronically Scanned Phased Arrays (ESPA) system; an Electronic Warfare (EW) system; an anti-electromagnetic interference material; a communication device having a switched mode power supply (SMPS) conditioning component; a magnetic bus bar, for example for wireless charging; an NFC shielding material; or an electronic bandgap meta-material. In some embodiments, the article is a microwave device, such as an antenna or an inductor. The article can be used in microwave absorption or microwave shielding applications. In some embodiments, the article is an antenna such as a patch antenna, an inverted-F antenna, or a planar inverted-F antenna.

Chemical composition and phase purity of the manufactured materials can be determined using techniques such as X-ray diffraction (XRD). Energy dispersive X-ray spectroscopy can be used to confirm the stoichiometry of the sintered products. Determination of morphology can be performed using Scanning Electron Microscopy (SEM). Magnetic and electrical properties including power loss, complex permeability, electrical impedance, and electrical resistivity can be determined using suitable methods and instrumentation. For example, power loss can be determined by a B—H analyzer, a power meter, or other equivalent measurement system; complex permeability and electrical impedance can be determined by an impedance analyzer or equivalent; and electrical resistivity can be determined by a megaohmmeter or equivalent.

The following example is merely illustrative of the multiphase ferrite composition and method of manufacture disclosed herein and is not intended to limit the scope hereof.

PROPHETIC EXAMPLE

Preparation of MnZn Ferrite $(Mn_{0.69}Zn_{0.20})Fe_{2.11}O_4$ spinel ferrite is prepared by conventional ceramic processing methods. High-purity raw oxides of $Fe_2O_3$ (purity 99.95%), $Mn_3O_4$ (purity 97%, with the remainder MnO), and ZnO (purity 99.99%) are combined in nominal ratios, milled, dried, and calcined at 900° C. for 4 h in air. Calcined MnZn ferrite are crushed and ground to an average particle size of 2 microns. Particle size is determined as a volume distribution particle size using an LA-960 Laser Particle Size Analyzer (Horiba).

Multiphase Ferrite Preparation

A series of multiphase ferrite samples are prepared by mixing YIG microscaled inclusion particles of average particle size 0.75 micron with the MnZn ferrite. Polyvinyl alcohol is added to the mixture to a concentration of 5 weight percent, where weight percent is based on the total weight of the composition, granulated, and then compressed under pressure to form a toroidal green body. The green body is sintered at 1200° C. for 4 h under a partial oxygen pressure ($PO_2$) of 5% and cooled in $N_2$ gas flow of 2 L/min to room temperature.

Measurement of Magnetic and Electrical Properties

All the specimens are measured for magnetic and electrical properties including power loss, complex permeability, and electrical impedance.

The multiphase ferrite compositions have the advantages of exhibiting ultra-low power loss while retaining high permeability and high magnetic flux density at an operating frequency of 50 kHz to 10 MHz, and are particularly suitable for use in power applications at high operating frequency, e.g. 50 kilohertz (KHz) to 10 megahertz (MHz). The multiphase ferrite compositions have a Pv of 50 to 150 milliWatt/centimeter$^3$ (mW/cm$^3$) at 200 kHz, 100 milliTesla (mT), a permeability of 1000 to 3500, an a saturation magnetic flux density of at least 450 mT.

The multiphase ferrite composition and method for manufacture of the multiphase ferrite composition disclosed herein are further illustrated by the following aspects, which are non-limiting.

Aspect 1. A method for manufacturing a multiphase ferrite composition, comprising combining MnZn ferrite particles, 0.01 to 10 weight percent microscaled inclusion particles comprising an orthoferrite $RFeO_3$, wherein R is a rare earth ion, preferably R is Y, Ho, Er, Gd, or Lu, more preferably R is Y, Ho, or Er; yttrium iron garnet (YIG); or a combination thereof, and optionally 0.01 to 5 weight percent additive to form a ferrite mixture, wherein weight percent is based on the total weight of the ferrite mixture, wherein the microscaled inclusion particles have an average particle size (D50) of 0.1 micron to 5 microns, preferably 0.15 to 2 microns or 1 to 5 microns, and wherein the D50 of the microscaled inclusion particles is smaller than the average particle size (D50) of the MnZn ferrite particles; granulating a slurry comprising the ferrite mixture and a binder solution to obtain granules of 50 to 750 microns, preferably 100 to 500 microns; compressing the granules to form a green body; sintering the green body in 0.01 to 20% oxygen to form a multiphase ferrite composition.

Aspect 2. The method of aspect 1 wherein the MnZn ferrite particles comprise $Mn_{1-x}Zn_xFe_{2+y}O_4$, wherein x=0.1 to 0.9, and y=0 to 0.4, and optionally a dopant.

Aspect 3. The method of aspect 2 wherein the dopant comprises Co, Ni, Ti, Zr, Sn, Si, V, Ta, Nb, Ca, or a combination thereof.

Aspect 4. The method of any one of aspects 1 to 3, wherein the microscaled inclusion particles further comprise a dopant.

Aspect 5. The method of aspect 4 wherein the microscaled inclusion particles comprise orthoferrite and the dopant comprises Zr, Ti, or a combination thereof; or wherein the microscaled inclusion particles comprise YIG and the dopant comprises Ce, Ca, V, Mn, Gd, Al, In, or a combination thereof.

Aspect 6. The method of any one of aspects 1 to 5, wherein the microscaled inclusion particles comprise $YFeO_3$, YIG, or a combination thereof.

Aspect 7. The method of any one of aspects 1 to 6, wherein the optional additive is CaO, $SiO_2$, $TiO_2$, $ZrO_2$, $SnO_2$, $V_2O_5$, $Nb_2O_5$, $Ta_2O5$, CoO, or a combination thereof.

Aspect 8. The method of any one of aspects 1 to 7, wherein the MnZn ferrite particles have an average particle size (D50) of 0.5 micron to 10 microns, preferably 0.5 to 2 microns, or 1 to 5 microns, or 5 to 10 microns.

Aspect 9. The method of any one of aspects 1 to 8, further comprising grinding the ferrite mixture to obtain MnZn ferrite particles having an average particle size (D50) of 0.5 micron to 10 microns, preferably 0.5 to 2 microns, or 1 to 5 microns, or 5 to 10 microns; synthesizing the MnZn ferrite particles; synthesizing the microscaled inclusion particles; or cooling the sintered green body to obtain the multiphase ferrite composition.

Aspect 10. The method of any one of aspects 1 to 9, wherein the binder solution comprises polyvinyl alcohol (PVA) or polyvinyl butyral (PVB), preferably the binder solution comprises PVA or PVB at a concentration of 4 to 6 weight percent, based on total weight of the binder solution.

Aspect 11. The method of any one of aspects 1 to 10, wherein granulating is performed by spray drying the slurry.

Aspect 12. The method of any one of aspects 1 to 11, wherein compressing the granules to form a green body is performed at 0.3 to 4 Tonne/cm$^2$, preferably 0.5 to 3 Tonne/cm$^2$.

Aspect 13. A multiphase ferrite composition manufactured by the method of any one of aspects 1 to 12.

Aspect 14. A multiphase ferrite composition comprising: a primary phase consisting of a MnZn ferrite matrix; and 0.01 to 10 weight percent microscaled inclusion particles comprising an orthoferrite $RFeO_3$, wherein R is a rare earth ion, preferably R is Y, Ho, Er, Gd, or Lu, more preferably R is Y, Ho, or Er; yttrium iron garnet (YIG); or a combination thereof, wherein the microscaled inclusion particles have an average particle size (D50) of 0.1 micron to 5 microns, preferably 0.15 to 2 microns, or 1 to 5 microns, and wherein the D50 of the microscaled inclusion particles is smaller than the average particle size (D50) of the MnZn ferrite particles; and optionally 0.01 to 5 weight percent additive; wherein weight percent is based on the total weight of the multiphase ferrite composition.

Aspect 15. The multiphase ferrite composition of aspect 14 wherein the MnZn ferrite matrix comprises $Mn_{1-x}Zn_xFe_{2+y}O_4$, wherein x=0.1 to 0.9, and y=0 to 0.4, and optionally a dopant.

Aspect 16. The multiphase ferrite composition of aspect 15 wherein the dopant comprises Co, Ni, Ti, Zr, Sn, Si, V, Ta, Nb, Ca, or a combination thereof.

Aspect 17. The multiphase ferrite composition of any one of aspects 14 to 16, wherein the microscaled inclusion particles further comprise a dopant.

Aspect 18. The multiphase ferrite composition of aspect 17 wherein the microscaled inclusion particles comprise orthoferrite and the dopant is Zr, Ti, or a combination thereof; or wherein the microscaled inclusion particles comprise YIG and the dopant is Ce, Ca, V, Mn, Gd, Al, In, or a combination thereof.

Aspect 19. The multiphase ferrite composition of any one of aspects 14 to 18, wherein the microscaled inclusion particles comprise $YFeO_3$, YIG, or a combination thereof.

Aspect 20. The multiphase ferrite composition of any one of aspects 14 to 19, wherein the optional additive is CaO, $SiO_2$, $TiO_2$, $ZrO_2$, $SnO_2$, $V_2O_5$, $Nb_2O_5$, $Ta_2O5$, CoO, or a combination thereof.

Aspect 21. The multiphase ferrite composition of any one of aspects 13 to 20 having a power loss (Pv) of 50 to 150 mW/cm$^3$ at 200 kHz, 100 mT; a permeability of 1000 to 3500; a magnetic flux density of at least 450 mT, or a combination thereof.

Aspect 22. An article comprising the multiphase ferrite composition of any one of aspects 13 to 21 or made by the method of any one of aspects 1 to 12.

Aspect 23. The article of aspect 22 which is a transformer, an electronic device, an inductor, a power electronic device, a power system, a power supply, or a power converter.

In general, the compositions, articles, and methods described here can alternatively comprise, consist of, or consist essentially of, any components or steps herein disclosed. The articles and methods can additionally, or alternatively, be manufactured or conducted so as to be devoid, or substantially free, of any ingredients, steps, or components not necessary to the achievement of the function or objectives of the present claims.

The singular forms "a," "an," and "the" include plural referents unless the context clearly dictates otherwise. "Or" means "and/or." Unless defined otherwise, technical and scientific terms used herein have the same meaning as is commonly understood by one of skill in the art to which the claims belong. A "combination" is inclusive of blends, mixtures, alloys, reaction products, and the like. The values described herein are inclusive of an acceptable error range for the particular value as determined by one of ordinary skill in the art, which will depend in part on how the value is measured or determined, i.e., the limitations of the measurement system. The endpoints of all ranges directed to the same component or property are inclusive of the endpoints and intermediate values, and independently combinable. In a list of alternatively useable species, "a combination thereof" means that the combination can include a combination of at least one element of the list with one or more like elements not named. Also, "at least one of" means that the list is inclusive of each element individually, as well as combinations of two or more elements of the list, and combinations of at least one element of the list with like elements not named.

Unless specified otherwise herein, all test standards are the most recent standard in effect as of the filing date of this application, or, if priority is claimed, the filing date of the earliest priority application in which the test standard appears. Unless defined otherwise, technical and scientific terms used herein have the same meaning as is commonly understood by one of skill in the art to which this disclosure belongs.

All cited patents, patent applications, and other references are incorporated herein by reference in their entirety. However, if a term in the present application contradicts or conflicts with a term in the incorporated reference, the term from the present application takes precedence over the conflicting term from the incorporated reference.

While the disclosed subject matter is described herein in terms of some embodiments and representative examples, those skilled in the art will recognize that various modifications and improvements can be made to the disclosed subject matter without departing from the scope thereof. Additional features known in the art likewise can be incorporated. Moreover, although individual features of some embodiments of the disclosed subject matter can be discussed herein and not in other embodiments, it should be apparent that individual features of some embodiments can be combined with one or more features of another embodiment or features from a plurality of embodiments.

What is claimed is:

1. A method for manufacturing a multiphase ferrite composition, comprising combining
   MnZn ferrite particles,
   0.01 to 10 weight percent microscaled inclusion particles comprising an orthoferrite $RFeO_3$ wherein R is a rare earth ion, and
   optionally 0.01 to 5 weight percent additive
   to form a ferrite mixture,
   wherein weight percent is based on the total weight of the ferrite mixture,
   wherein the microscaled inclusion particles have an average particle size (D50) of 0.1 micron to 5 microns, and
   wherein the D50 of the microscaled inclusion particles is smaller than the D50 of the MnZn ferrite particles;
   granulating a slurry comprising the ferrite mixture and a binder solution to obtain granules of 50 to 750 microns;
   compressing the granules to form a green body; and
   sintering the green body in 0.01 to 20% oxygen to form a multiphase ferrite composition.

2. The method of claim 1 wherein the MnZn ferrite particles comprise $Mn_{1-x}Zn_xFe_{2+y}O_4$, wherein x=0.1 to 0.9, and y=0 to 0.4, and optionally a dopant.

3. The method of claim 2 wherein the dopant comprises Co, Ni, Ti, Zr, Sn, Si, V, Ta, Nb, Ca, or a combination thereof.

4. The method of claim 1, wherein the microscaled inclusion particles further comprise a dopant.

5. The method of claim 4 wherein the microscaled inclusion particles comprise orthoferrite and the dopant comprises Zr, Ti, or a combination thereof.

6. The method of claim 1, wherein the microscaled inclusion particles comprise $YFeO_3$.

7. The method of claim 1, wherein the optional additive is CaO, $SiO_2$, $TiO_2$, $ZrO_2$, $SnO_2$, $V_2O_5$, $Nb_2O_5$, $Ta_2O5$, CoO, or a combination thereof.

8. The method of claim 1, wherein the MnZn ferrite particles have an average particle size (D50) of 0.5 micron to 10 microns.

9. The method of claim 1, further comprising
   grinding the ferrite mixture to obtain MnZn ferrite particles having an average particle size (D50) of 0.5 micron to 10 microns;
   synthesizing the MnZn ferrite particles;
   synthesizing the microscaled inclusion particles; or
   cooling the sintered green body to obtain the multiphase ferrite composition.

10. The method of claim 1, wherein the binder solution comprises polyvinyl alcohol (PVA) or polyvinyl butyral (PVB).

11. The method of claim 1, wherein granulating is performed by spray drying the slurry.

12. The method of claim 1, wherein compressing the granules to form a green body is performed at 0.3 to 4 Tonne/cm$^{22}$.

13. A multiphase ferrite composition comprising:
    a primary phase consisting of a MnZn ferrite matrix comprising MnZn ferrite particles; and
    0.01 to 10 weight percent microscaled inclusion particles comprising
       an orthoferrite $RFeO_3$ wherein R is a rare earth ion,
       wherein the microscaled inclusion particles have an average particle size (D50) of 0.1 micron to 5 microns, and
       wherein the D50 of the microscaled inclusion particles is smaller than the average particle size (D50) of the MnZn ferrite particles; and
    optionally 0.01 to 5 weight percent additive;
    wherein weight percent is based on the total weight of the multiphase ferrite composition.

14. The multiphase ferrite composition of claim 13 wherein the MnZn ferrite matrix comprises $Mn_{1-x}Zn_xFe_{2+y}O_4$, wherein x=0.1 to 0.9, and y=0 to 0.4, and optionally a dopant.

15. The multiphase ferrite composition of claim 14 wherein the dopant comprises Co, Ni, Ti, Zr, Sn, Si, V, Ta, Nb, Ca, or a combination thereof.

16. The multiphase ferrite composition of claim 13, wherein the microscaled inclusion particles further comprise a dopant.

17. The multiphase ferrite composition of claim 16 wherein the microscaled inclusion particles comprise orthoferrite and the dopant is Zr, Ti, or a combination thereof.

18. The multiphase ferrite composition of claim 13, wherein the microscaled inclusion particles comprise $YFeO_3$.

19. The multiphase ferrite composition of claim 13, wherein the optional additive is CaO, $SiO_2$, $TiO_2$, $ZrO_2$, $SnO_2$, $V_2O_5$, $Nb_2O_5$, $Ta_2O5$, CoO, or a combination thereof.

20. The multiphase ferrite composition of claim 13 having a power loss (Pv) of 50 to 150 mW/cm$^3$ at 200 kHz, 100 mT; a permeability of 1000 to 3500; a magnetic flux density of at least 450 mT, or a combination thereof.

21. An article comprising the multiphase ferrite composition of claim 13.

22. The article of claim 21 which is a transformer, an electronic device, an inductor, a power electronic device, a power system, a power supply, or a power converter.

* * * * *